United States Patent [19]

Sunami

[11] Patent Number: 4,996,514

[45] Date of Patent: Feb. 26, 1991

[54] CAR THEFT PROOFING SYSTEM

[76] Inventor: Sadakatsu Sunami, 8-3, Asukanokita 3-chome, Ikoma-shi, Nara-ken, Japan

[21] Appl. No.: 392,791

[22] Filed: Aug. 11, 1989

[30] Foreign Application Priority Data

Nov. 18, 1988 [JP] Japan ............................... 63-293411

[51] Int. Cl.$^5$ .............................................. B60R 25/10
[52] U.S. Cl. .................................... 340/426; 340/542;
340/539; 307/10.2; 200/61.64; 70/416;
70/DIG. 49; 70/DIG. 51; 180/173; 180/287
[58] Field of Search ........... 340/426, 541, 542, 825.31,
340/825.32, 539; 307/9.1, 10.1, 10.2, 10.3;
200/61.64; 70/416-419, 379 R, 357, DIG. 2,
DIG. 21, DIG. 38, DIG. 49, DIG. 51;
180/173, 287

[56] References Cited

U.S. PATENT DOCUMENTS

| | | | |
|---|---|---|---|
| 3,668,526 | 6/1972 | Raskin | 340/539 |
| 3,936,673 | 2/1976 | Kelly et al. | 340/426 |
| 4,628,300 | 12/1986 | Amato | 340/426 |
| 4,665,385 | 5/1987 | Henderson | 340/539 |
| 4,855,710 | 8/1989 | Kikuchi et al. | 307/10.3 |

Primary Examiner—Bonnie L. Crosland
Attorney, Agent, or Firm—Edwin E. Greigg

[57] ABSTRACT

A car theft proofing system includes a sensor disposed in a cylinder lock for detecting insertion into the cylinder lock of a door key or other article, an alarm device for giving an alarm, an alarm drive device for driving the alarm device, a control unit for causing the alarm device to give the alarm in response to signals received from the sensor and the alarm drive device, and a radio transmitter for transmitting a radio wave upon insertion of the article. The alarm drive device includes a portable remote control transmitter and a receiver disposed on a car body. The remote control transmitter includes an abnormality alarm for transmitting a theft signal in response to the radio wave transmitted from the radio transmitter.

9 Claims, 6 Drawing Sheets

CAR THEFT PROOFING SYSTEM

BACKGROUND OF THE INVENTION (1) Field of the Invention

The present invention relates to car theft proofing systems, and more particularly to a car theft proofing system acting as a safeguard against a car theft in which a thief unlocks a car door.

(2) Cross-Reference to Related Applications

This application contains further improvements in the general subject matter disclosed in Application Ser. No. 240,670 filed Sept. 6, 1988 and Ser. No. 368,723 filed June 21, 1989.

(3) Description of the Prior Art

Conventionally, when leaving a car, the car owner (driver), to avoid theft, stops the engine with an engine key, pulls out the engine key, shuts the windows and locks the door by inserting a door key into a cylinder lock of the door, or interlocks the door and shut it with the outside door grip turned up to lock the door.

However, thieves often unlock the doors of parked cars by inserting a wire, imitation key or other article into the cylinder door lock, and steal car stereos and air-conditioners.

Car theft cases are taking place in an increasing number recently wherein not only the interior equipment such as car stereos but cars themselves are stolen and used in secondary, atrocious crimes such as robbery and kidnaping, or to cause traffic accidents.

SUMMARY OF THE INVENTION

Having regard to the problem in safeguarding cars against theft, the object of the present invention is to provide a car theft proofing system which gives an alarm before a thief forces open a door, i.e. gives an alarm merely with insertion into the cylinder lock of a door key or other article by a the if, and notifies the car owner of the abnormality by a radio wave when such a picklock attempt is made theft, and which allows the car owner or authorized person to turn off alarm drive means and/or a sensor in the cylinder lock before opening the car door, so that the alarm will not sound with insertion into the cylinder lock of a door key.

In order to achieve the above object, a car theft proofing system according to one aspect of the present invention comprises a sensor disposed in a cylinder lock for detecting insertion into the cylinder lock of a door key or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting the signal for driving the alarm device and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

The characterizing feature of the invention lies in that the main part of the system includes a radio transmitter for detecting insertion of a door key or other article and transmitting a radio wave, and that the alarm drive means includes a portable remote control transmitter and a receiver disposed on a car body, the remote control transmitter including abnormality alarm means for transmitting a theft signal in response to the radio wave transmitted from the radio transmitter.

Upon noting the abnormality, the car owner hurries to his or her car or reports to the police for catching the thief. Thus the system is effective for prevention of such a crime.

The sensor used in this invention is not limited to a particular type of sensor as long as it can be disposed adjacent a cylinder lock and can detect insertion into the cylinder lock of a door key or other article. The sensor may comprise a photosensor including a light emitting element and a light receiving element, or a proximity switch such as a limit switch operable through contact with the door key or other article.

The alarm device used in the present invention is not limited to a particular type as long as it is driven by the control means in response to the signal output from the sensor and the signal output from the alarm drive means. For example, the alarm device may comprise a buzzer for producing an extraordinary warning sound, a car horn, a signal lamp for emitting red light, or their combination.

The alarm drive means is not limited to a particularly type as long as it transmits the signal for driving the alarm device. The alarm drive device may comprise a combination of a remote control transmitter and a receiver, or a light emitter and a light receiver, or may be directly plugged into a connector provided on the car body to transmit a signal for driving the alarm device.

The control means is not limited to a particular construction as long as it outputs the alarm signal to the alarm device in response to the output signals from the sensor and the alarm drive device when a person other than the car owner or authorized person (namely a thief) inserts a door key or other article into the cylinder lock of the door. Specifically, the control means may comprise the CPU of a computer, that is a CPU storing a program for outputting an alarm signal to the alarm device upon receipt of the output signals from the alarm drive device and the sensor, a device including an AND circuit and the like of logic elements for outputting an alarm signal to the alarm device in response to the output signals from the alarm drive device and the sensor, or a device including a series circuit of a first switch connected to the sensor and a second switch connected to the receiver for outputting an alarm signal to the alarm device in response to the output signals from the sensor and the receiver.

According to the present invention, when the car owner leaves the car, he or she sets the alarm device to be operable by the alarm drive means. When in this state a thief inserts an article into the door cylinder lock, the sensor is turned on. As a result, the control means causes the alarm device to give an alarm in response to the signals from the alarm drive means and the sensor.

The abnormality is notified to the car owner by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by means of the sensor and/or the alarm drive means before opening the car door. Consequently, the alarm will not sound when he or she inserts a door key into the cylinder lock.

The present invention as constructed above has the following advantages.

An alarm is given when a thief inserts an article into the door cylinder lock. The abnormality is notified to the car owner by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by operating the alarm drive means and/or the sensor before opening the car door. Consequently, the alarm will not sound with insertion of the door key or other article into the cylinder lock.

Other advantages of the present invention will be apparent from the following description to be had with reference to the drawings.

BRIEF DESCRIPTION OF THE DRAWINGS

The drawings illustrate car theft proofing systems according to the present invention, in which.

DETAILED DESCRIPTION OF THE PREFERRED EMBODIMENTS

Embodiments of the present invention will particularly be described hereinafter, but the invention is not limited to such embodiments.

Figure 1:
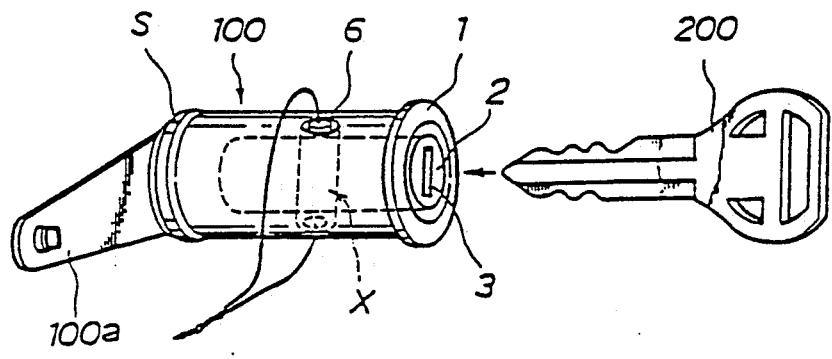
FIG. 1 is a perspective view of a cylinder lock for a car door.
Figure 2:
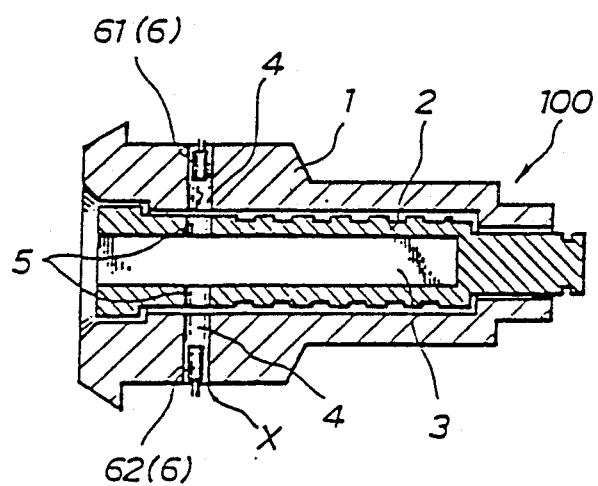
FIG. 2 is a sectional view of the cylinder lock.

FIG. 1 is a perspective view of a cylinder door lock of a car theft proofing system according to one embodiment of the present invention. FIG. 2 is a schematic sectional view of the cylinder door lock.

The cylinder door lock 100 comprises a hollow outer cylinder 1 and an inner cylinder 2 rotatably mounted in the outer cylinder 1. The inner cylinder 2 has a keyhole 3 for removably receiving a door key 200.

The outer cylinder 1 includes bores 4, and the inner cylinder 2 includes bores 5. These bores 4 and 5 communicate with one another to define a through bore X when the door key 200 is removed from the inner cylinder 2.

More particularly, the inner cylinder 2 is constantly maintained in a predetermined position relative to the outer cylinder 1 under the urging force of a spring S unless the inner cylinder 2 is rotated by the door key 200. Then the inner cylinder 2 is in the predetermined position, the bores 4 and 5 are aligned to define the through bore X.

A sensor 6 is provided in the bores 4 for detecting insertion into the door lock 100 of the door key 200 or other articles. This sensor 6 will be described in detail hereinafter.

Figure 3:
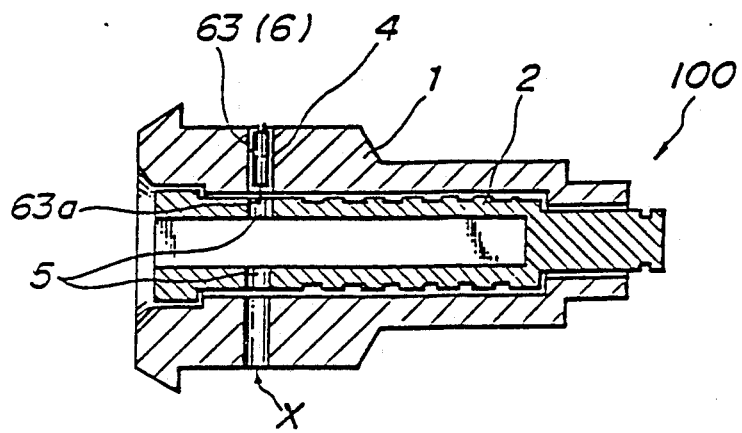
FIG. 3 is a sectional view of a modified cylinder lock.

The sensor 6 comprises a photosensor including a light emitting element and a light receiving element, or a proximity switch such as a limit switch operable through contact with the door key 200 or other article.

Where the sensor 6 comprises a photosensor, the photosensor 6 includes a light emitting diode 61 and a phototransistor 62. The light emitting diode 61 is mounted in one of the bores 4, and the phototransistor 62 in the other bore 4 of the outer cylinder 1. Consequently, when the through bore X is formed, light emitted from the diode 61 passes through the through bore X and enters the phototransistor 62.

Where the sensor 6 comprises a limit switch, as shown in FIG. 3, the switch 63 is mounted in one of the bores 4 of the outer cylinder 1, with a contact element 63a slightly exposed to one of the bores 5 of the inner cylinder 2.

When the door key 200 or other article is inserted through the keyhole 3, it contacts the contact piece 63a whereby the sensor is turned on to provide an output signal.

Figure 4:
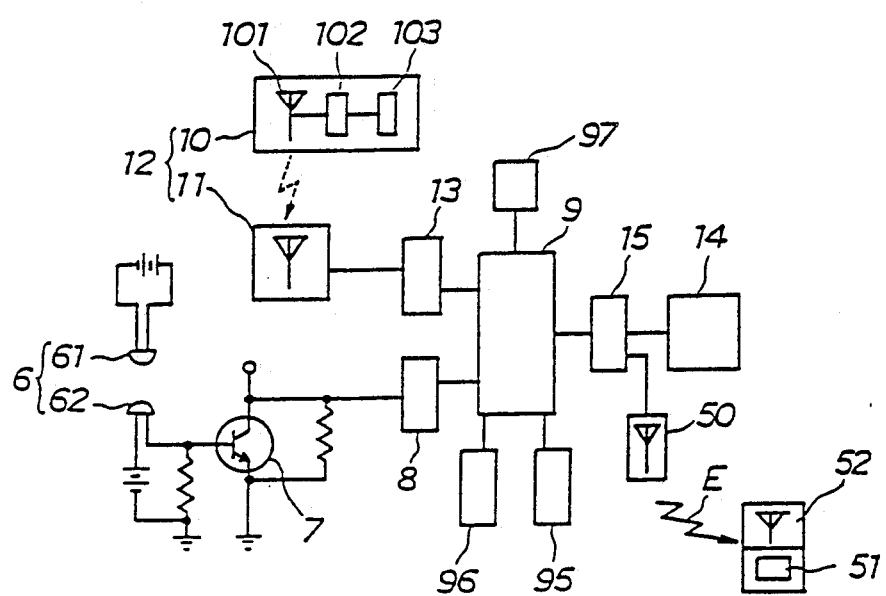
FIG. 4 is a block diagram of the embodiment of FIG. 3.

FIG. 4 is a block diagram of a car theft proofing system according to the present invention.

The phototransistor 62 of the sensor 6 is connected to the base of another transistor 7 which gives an output through an I/O interface 8 to the CPU of a computer which is one example of control unit 9.

An alarm drive device 12 acts as means to provide a signal for driving an alarm 14 to be described later and, as shown in FIG. 4, includes a remote control transmitter 10 and a receiver 11. The remote control transmitter 10 transmits radio waves with a frequency allotted to each car. This frequency may be shared to a certain extent by other cars as long as there is no possibility of interference (for example, interference may be avoided by regional allotment).

The transmitter 10 includes an antenna 101, a transmitting unit 102, and a control unit 103 for controlling them.

The receiver 11 acts as means to receive the radio waves transmitted from the remote control transmitter 10, and is installed on the car. The receiver 11 is connected through an I/O interface 13 to the CPU 9.

The alarm drive device 12 need not necessarily comprise the radio wave transmitting remote control type, but may comprise the light transmitting remote control type or may be directly plugged into a connector provided on a car body, for example.

In this case, the drive signal may be prevented from being generated when the car owner or other authorized person plugs the alarm drive device 12 into the connector a second time. Further, the drive signal may be transmitted to and stored in the computer by plugging the alarm drive device 12 into the connector provided on the car body, the alarm being turned off by remote control for the owner or other authorized person to open the door.

The alarm 14 may comprise a buzzer for producing an extraordinary warning sound, a car horn, a signal lamp for emitting red light, or their combination.

A ROM 95 is connected to the CPU 9. The ROM 95 stores a program for causing the CPU 9 to output an alarm signal to the alarm 14 in response to the signals transmitted from the receiver 11 and the sensor 6.

A RAM 96 is connected to the CPU 9 to be used for reading and writing data for the operation of CPU 9.

A radio transmitter 50 is connected to the I/O interface 15 for transmitting a radio wave E in response to the signal for driving the alarm 14. The remote control transmitter 10 includes an abnormality alarm device 51 for transmitting a theft signal in response to the radio wave E transmitted from the radio transmitter 50.

Number 52 indicates a radio receiver included in the remote control transmitter 10 which receives the radio wave E for the alarm device 51 to transmit the theft signal.

When the car owner notes the abnormality by the buzzer or pilot lamp, he may hurry to his car and catch a thief or report to the police. This is very effective to prevent such a crime.

Figure 5:
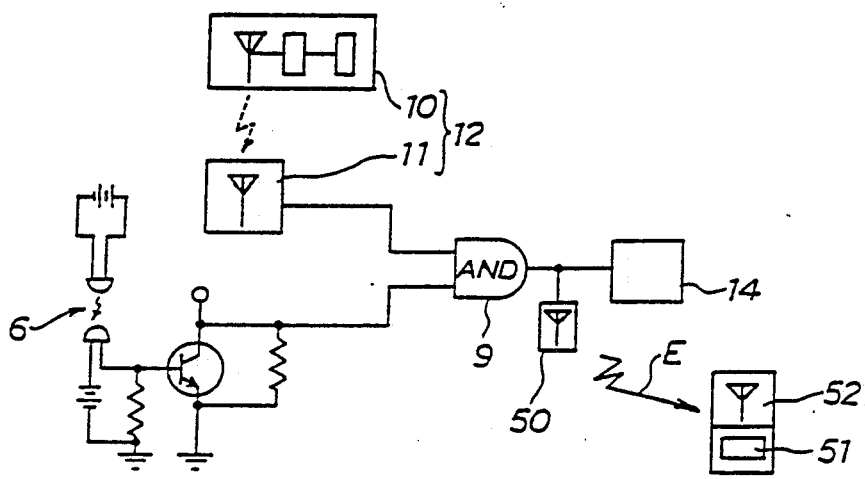
FIG. 5 is a block diagram of another car theft proofing system.

FIG. 5 is a block diagram of another embodiment of the present invention.

In FIG. 5, the control unit 9 includes an AND circuit and the like of logic elements, and receives the output of the receiver 11 and an output signal of the sensor 6, and in response to these signals outputs a drive signal to the alarm 14.

A radio transmitter 50 is connected between the control unit 9 and the alarm 14 for transmitting a radio wave E in response to the signal for driving the alarm 14. The remote control transmitter 10 includes an abnormality alarm device 51 for transmitting a theft signal in response to the radio wave E transmitted from the radio transmitter 50.

Number 52 indicates a radio receiver included in the remote control transmitter which receives the radio wave E for the alarm device 51 to transmit the theft signal.

Figure 6:
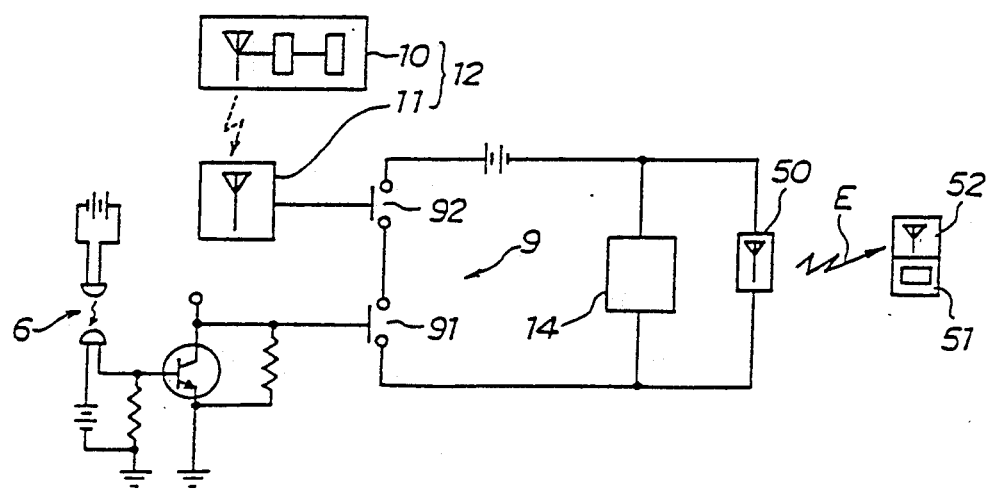
FIG. 6 is a block diagram of a further car theft proofing system.

FIG. 6 is a block diagram of a control unit 9 according to a further embodiment of the present invention.

In FIG. 6, the control unit 9 includes a series circuit of first switch 91 connected to the sensor 6 and a second switch 92 connected to the receiver 11. In this case too, the control unit 9 receives the signals from the sensor 6 and receiver 11, and outputs a drive signal to the alarm 14 only when both signals are on.

The above series circuit includes a radio transmitter 50 connected parallel to the alarm 14 for transmitting a radio wave E in response to the signal for driving the alarm 14. The remote control transmitter 10 includes an abnormality alarm device 51 for transmitting a theft signal in response to the radio wave E transmitted from the radio transmitter 50.

Number 52 indicates a radio receiver included in the remote control transmitter 10 which receives the radio wave E for the alarm device 51 to transmit the theft signal.

An operation of the foregoing embodiments where the sensor 6 comprises a photosensor will particularly be described next.

When the car owner leaves the car, he or she shuts the window, locks the door, and operates the remote control transmitter 10 to transmit the signal. This radio wave is received by the receiver 11 and input to the CPU (control unit) 9.

Assume that a thief approaches the car in this state, and attempts to open the car door by inserting an imitation key or the like into the cylinder door lock 100. When the door lock 100 is turned by the article inserted thereto, the through bore X is broken and the light is interrupted. As a result, the sensor 6 detects entry of the picklock instrument. The turnon signal of the sensor 6 is input through the I/O interface 8 to the CPU 9. The CPU 9 outputs the alarm signal to the alarm 14 in response to the signal from the receiver 11 and the signal from the sensor 6. THus an alarm buzzer is given before the thief opens the door by means of a picklock instrument, whereby the car is safeguarded against theft. The period for alarm sounding may be preset to the CPU 9.

The I/O interface 15 includes the radio transmitter 50 for transmitting a radio wave E in response to the signal for driving the alarm 14. The remote control transmitter 10 includes the abnormality alarm device 51 for transmitting a theft signal in response to the radio wave E transmitted from the radio transmitter 50. Thus, when the car owner notes the abnormality by the buzzer or pilot lamp, he may hurry to his car and catch a thief or report to the police. This is very effective to prevent such a crime.

On the other hand, when the car owner intends to open the car door with the door key 200, he or she cancels the alarm drive signal by means of the remote control transmitter 10. Then the alarm will not sound with insertion into the door lock 100 of the door key 200 since the signal is not input from the receiver 11 though the sensor 6 gives the turn-on signal whereby the CPU 9 does not output the control signal to the alarm 14.

The AND circuit in the embodiment of FIG. 5, and the series circuit in the embodiment of FIG. 6 operate in the same way as the CPU 9.

In the present invention, the theft signal from the abnormality alarm device 51 of the remote control transmitter 10 is given by a buzzer or flashing of the lamp. The construction is therefore simple and effective for notifying the abnormality to the car owner.

Figure 7:
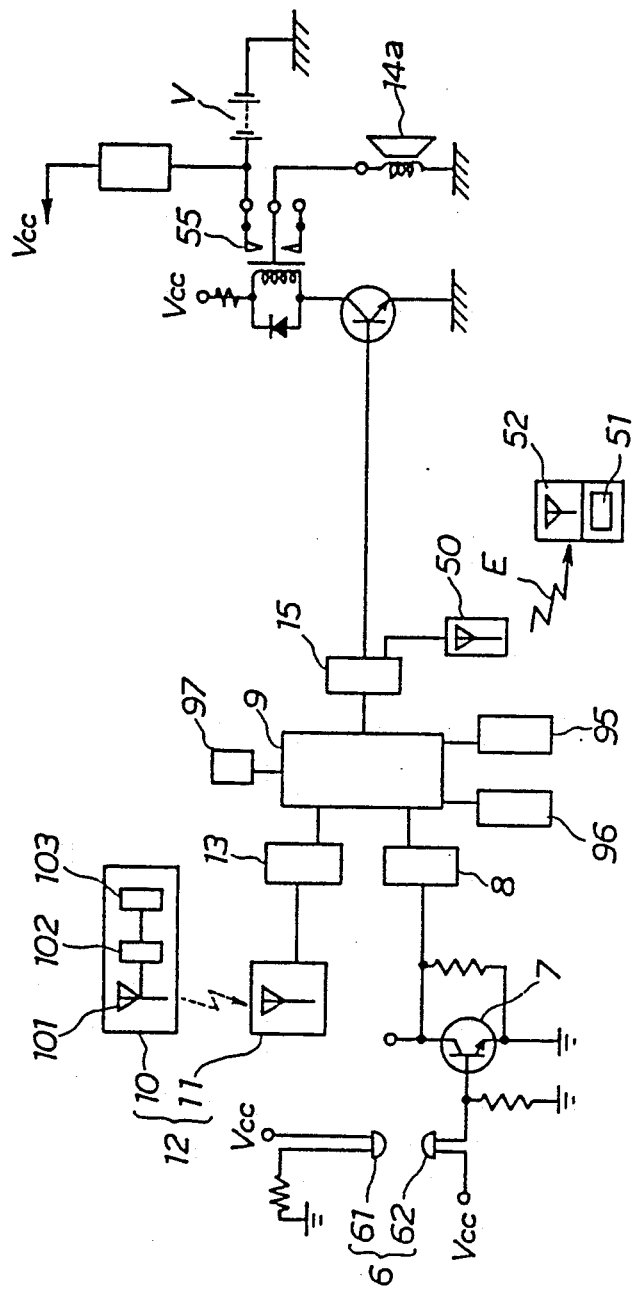
FIGS. 7 and 8 are block diagrams of still further car theft proofing systems.

As shown in FIG. 7, the battery mounted in the car body may be used a system power source V. This realizes a simple system, and greatly facilitates its provision in the car body.

Number 55 indicates a relay for supplying power to the buzzer 14a when a thief opens the lock.

Figure 8:
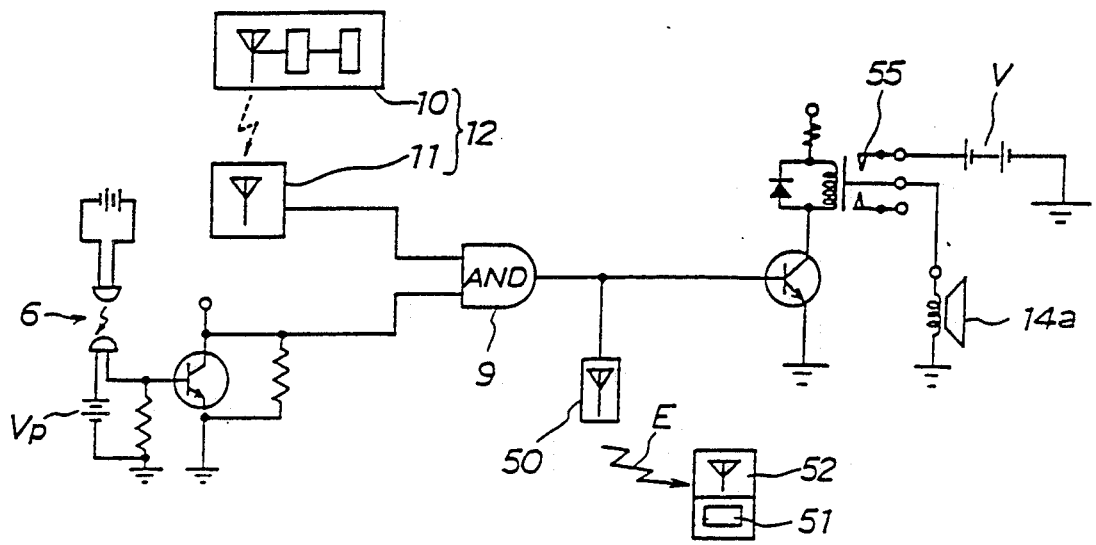

As shown in FIG. 8, the car battery may be used as an alarm driving power source for the system in the car body, and a reserve battery may be used for driving the other circuits. Then the load is reduced for the car battery, and the use of the car battery as the alarm driving power source V allows the alarm to operate reliably.

Number 55 in FIG. 8 indicates a relay for supplying power to the buzzer 14a when a thief opens the lock.

The present invention sets a driving period to the alarm 14 to avoid a long operation of the alarm 14. This is effective to reduce noise as well as the load for the alarm driving power source.

The remote control transmitter 10 may include a device for forcibly turning off the alarm 14. Then a long alarm operation may be avoided to reduce noise and the load for the alarm driving power source when the car owner has operated the alarm 14 in error or after a thief is caught.

Figure 10:
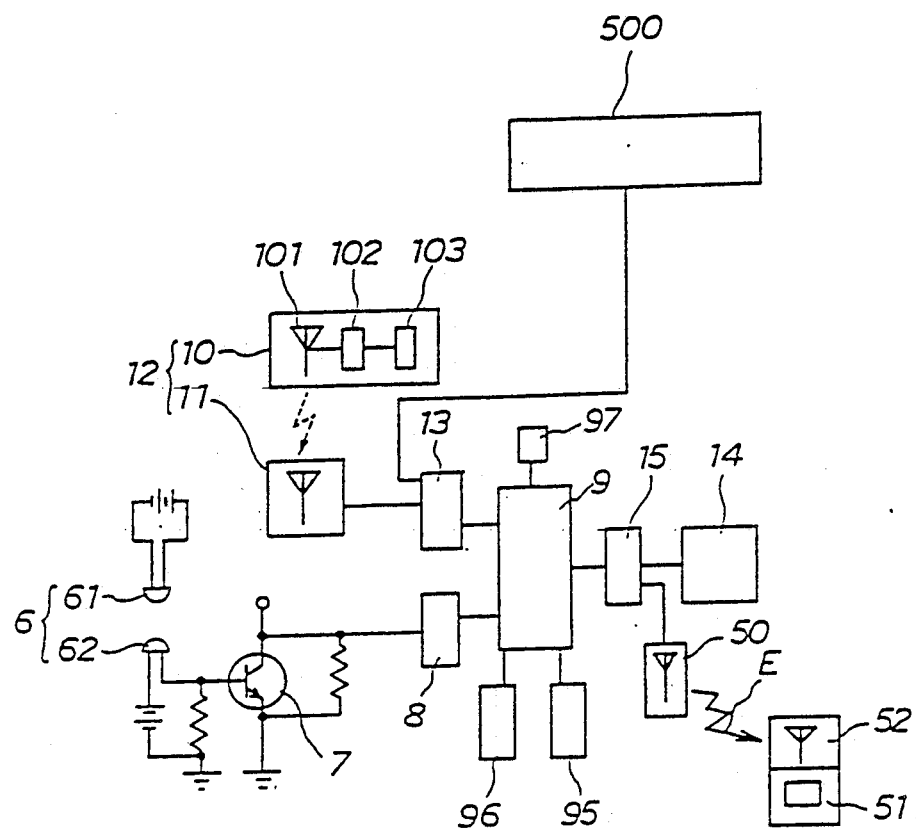
FIG. 10 is a block diagram showing a different car theft proofing system.

In the car theft proofing system of the present invention, as shown in FIG. 10, a window/door lock mechanism 500 may output a system setting signal to automatically set the system when the car owner stops the engine with an engine key and pulls out the engine key, or shuts the door and locks it with a door key 200, or interlocks the door and shut it with the outside door grip turned up to lock the door. Then, the system is automatically set as the car owner takes the above action, hence eliminating the possibility of the owner forgetting to set the system. In this case, a limit switch provided adjacent an interlocked element 100a of the cylinder lock 100 which switch is operable to set the system with rotation of the inner cylinder 2 caused by the door key 200. Alternatively, the system may be set by a proximity switch operable through contact with an operating rod when the car door is interlocked.

Further, in this case, the remote control transmitter 10 is used to turn off the alarm 14 when the car owner opens the car door.

According to the present invention, as shown in FIG. 4, the car body includes the set lamp 96 for enabling confirmation that the system is set by the remote control transmitter 10. Thus, the car owner can readily confirm that the car theft proofing system is positively set, which promotes assurance for car theft prevention.

Figure 9:
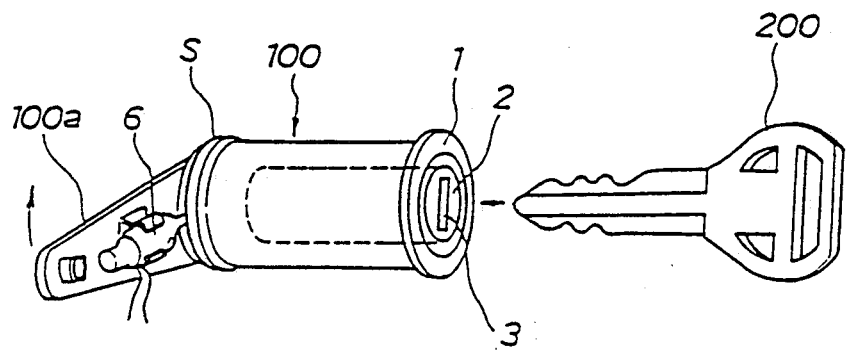
FIG. 9 is a perspective view of a further embodiment.

In providing the sensor 6 for the cylinder lock 100, as shown in FIG. 9, a mercury switch may be included in the interlocked element 100a of the cylinder lock 100, which is rotatable to turn on the sensor 6.

The car theft proofing system of the present invention is applicable not only to car doors but also to trunks and others.

The output signal of the sensor 6 may be transmitted through an optical fiber cable. This will promote reliability with less chances of operational errors due to noise.

The sensor 6 may be turned on, with the cable leading to the engine electrically broken, when the engine is stopped and the engine key is pulled out. Consequently, the engine will not started when the cable is connected.

Further, the sensor 6 may be turned on when the engine is stopped and the engine key is pulled out. With the sensor 6 is once turned on, the alarm may continue after opening of the door until the sensor 6 is turned off by using the alarm drive means 12.

As will be clear from the foregoing description of embodiments, the theft signal comprising a buzzer or flashing of a lamp realizes a simple construction and positively notifies an abnormality to the car owner or authorized driver.

The use of a car battery as a system power source mounted in the car body simplifies the system and greatly facilitates its provision in the car body.

The use of a car battery as a system power source mounted in the car body, and a reserve battery as a power source for driving other circuits has the advantages that the load is reduced for the car battery, and the alarm operates reliably.

The driving period set for the alarm is effective to avoid a long operation of the alarm thereby reducing noise, and greatly lighten the load for the alarm driving power source.

The remote control transmitter including means to forcibly turn off the alarm avoids a long alarm operation to reduce noise and the load for the alarm driving power source when the car owner has operated the alarm 14 in error or after a thief is caught.

The set lamp provided for enabling confirmation that the system is set by the remote control transmitter enables the car owner to readily confirm that the car theft proofing system is positively set, which promotes assurance for car theft prevention.

The feature that the system is set when the engine is stopped by an engine key and the engine key is pulled out or the door is locked, eliminates the possibility of the owner forgetting to set the system, thereby assuring an excellent safety aspect.

Setting of the system can be visually confirmed at all times, which promotes the excellent theft proofing effect.

What is claimed is:

1. A car theft proofing system comprising a sensor disposed within a cylinder lock for detecting insertion into the cylinder lock of a door key or other article, an alarm device for giving an alarm, alarm drive means to output a signal for driving the alarm device, control means to cause the alarm device to give the alarm in response to a signal received from the sensor and the signal received from the alarm drive means, and a radio transmitter for detecting insertion of the article and transmitting a radio wave, wherein said alarm drive means includes a portable remote control transmitter and a receiver disposed on a car body, said remote control transmitter including abnormality alarm means for transmitting a theft signal in response to the radio wave transmitted from said radio transmitter.

2. A car theft proofing system as claimed in claim 1, wherein said theft signal comprises a buzzer or flashing of a lamp.

3. A car theft proofing system as claimed in claim 2, wherein a car battery is used as a system power source mounted in the car body.

4. A car theft proofing system as claimed in claim 1 wherein a car battery is used as a system power source mounted in the car body, and a reserve battery is used as a power source mounted in the car body for driving other circuits.

5. A car theft proofing system as claimed in claim 1, wherein a drive period is set for said alarm.

6. A car theft proofing system as claimed in claim 1, wherein said remote control transmitter includes means to forcibly turn off said alarm.

7. A car theft proofing system as claimed in claim 1, wherein said remote control transmitter is operable to set the system to any operable state.

8. A car theft proofing system as claimed in claim 1, wherein the system is set when an engine is stopped by an ignition key and the ignition key is pulled out or the door is locked.

9. A car theft proofing system as claimed in claim 7, further comprising a set lamp for enabling confirmation that the system is set.

* * * * *